United States Patent [19]
Hardwick

[11] Patent Number: 4,879,890
[45] Date of Patent: Nov. 14, 1989

[54] EXPLOSIVE EXPANSION OF METAL TUBES

[75] Inventor: Roy Hardwick, Troon, Scotland

[73] Assignee: Imperial Chemical Industries PLC, London, England

[21] Appl. No.: 242,809

[22] Filed: Sep. 2, 1988

[30] Foreign Application Priority Data

Sep. 18, 1987 [GB] United Kingdom ............... 8721985

[51] Int. Cl.⁴ ............................................ B21D 26/08
[52] U.S. Cl. ......................................... 72/62; 72/54;
72/56; 72/61; 72/706; 72/430; 29/421.2;
228/107
[58] Field of Search ...................... 72/54, 56, 61, 706,
72/430; 29/421 E, 522 R, 421 R; 228/107, 108, 109

[56] References Cited

U.S. PATENT DOCUMENTS

| | | | |
|---|---|---|---|
| 3,036,374 | 5/1962 | Williams | 228/108 |
| 3,220,103 | 11/1965 | Simons | 29/421.2 |
| 3,235,955 | 2/1966 | Kunsagi | 29/421.2 |
| 3,364,561 | 1/1968 | Barrington | 228/108 |
| 3,394,569 | 7/1968 | Smith | 72/62 |
| 3,423,979 | 1/1969 | Smith et al. | 72/56 |
| 3,434,194 | 3/1969 | Whittaker et al. | 29/421.2 |
| 3,863,327 | 2/1975 | Legate et al. | 72/56 |
| 4,187,709 | 2/1980 | Legate et al. | 72/62 |
| 4,669,649 | 6/1987 | Persson | 228/107 |
| 4,685,205 | 8/1987 | Schroeder et al. | 72/706 |

*Primary Examiner*—David Jones
*Attorney, Agent, or Firm*—Cushman, Darby & Cushman

[57] ABSTRACT

In a method of explosively expanding a tubular metal component into engagement with a surrounding metal component, an explosive charge is disposed axially and fired in an insert having a hollow cylindrical container fitting closely within the portion of the tubular metal component to be expanded and having charge holding device, for example an axial pocket, to accommodate the explosive charge, the container being filled with a shock wave-transmitting liquid. Compared with solid inserts, the novel hollow insert is cheaper and requires a smaller explosive charge for a given operation. The method is especially advantageous for expanding large diameter tubes.

11 Claims, 1 Drawing Sheet

U.S. Patent   Nov. 14, 1989   4,879,890
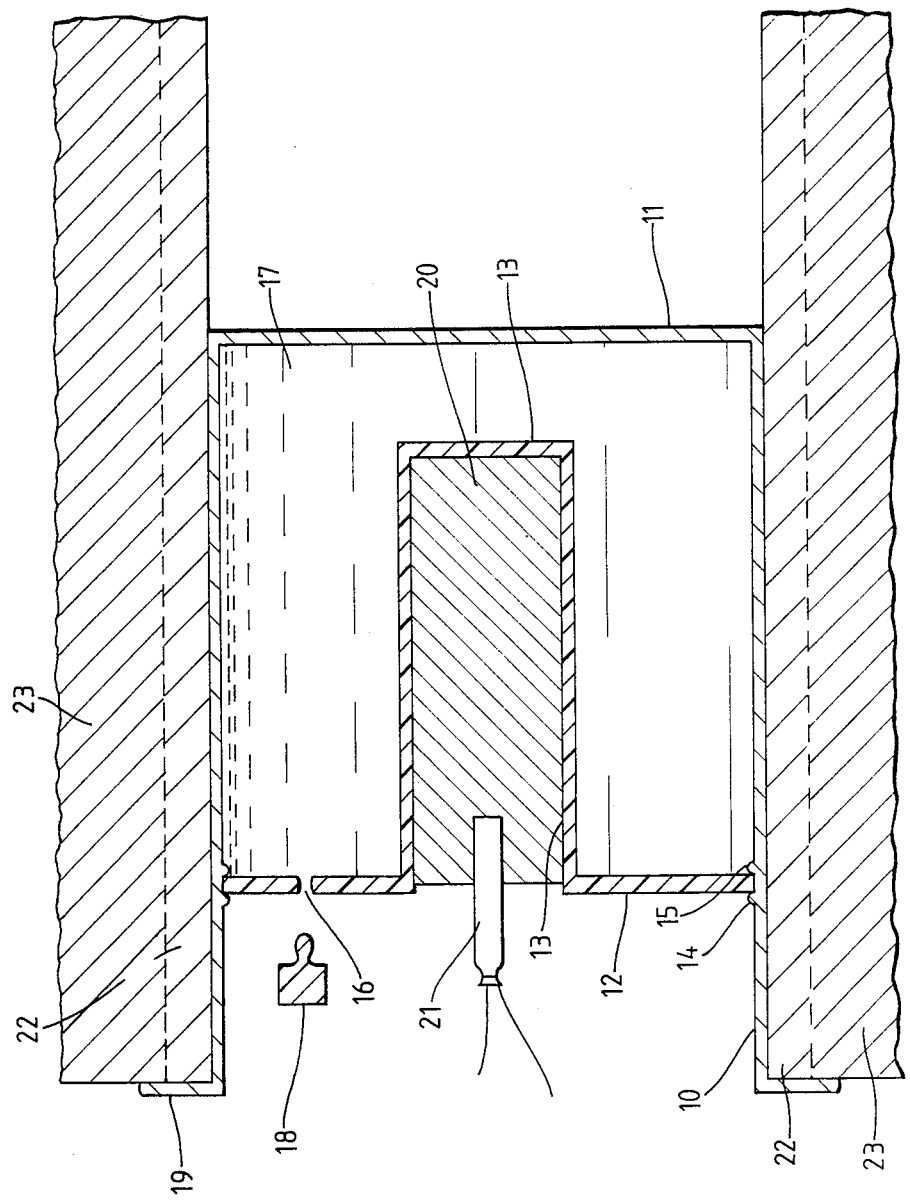

EXPLOSIVE EXPANSION OF METAL TUBES

This invention relates to a method of explosively expanding a metal tube into engagement with a surrounding metal component and to a shock wave-transmitting insert for use in the said method.

The expansion of metal tubes into bores in surrounding metal components is well known and is employed, for example, to expand tubes into tubeplates in the manufacture of boilers and heat exchangers. The joint formed between the tube and the surrounding component may be a mechanical or metallurgically bonded joint. In the expansion process an explosive charge is initially located and exploded within the tube bore at a position coincident with a surrounding component. In one arrangement which is favoured for small diameter tubes the explosive charge is initially disposed axially within a thick-walled tubular shock wave-transmitting component which is generally termed an insert. Usually the insert is moulded from a material such as polyethylene, rubber or wax. Before it is exploded, the explosive charge is located in the insert to lie symmetrically at the axis of the tube bore. In an alternative arrangement which is advantageous for larger diameter tubes the explosive charge is initially disposed in the form of an annular charge in close proximity to the tube bore. The annular charge is more economical for large tubes since the large inserts, needed for axially disposed charges in large diameter tubes are excessively expensive due to the large volume of material required and the long moulding time required in their manufacture in order to avoid cavitation. Moreover, heavier axial charges are required since the thicker wall of the insert significantly attenuates the shock wave and the attenuation must be compensated by an increased charge. However, a serious disadvantage of an annular charge is that it must be initiated by a complex initiation system in order to obtain simultaneous initiation around the entire circumference, since single-point initiation gives rise to tube damage when the separate diverging detonation fronts emanating from the point of initiation and travelling around the tube bore circumference meet at a position diametrically opposite the initiation point (i.e. the "Dautriche" effect).

It is an object of this invention to provide an improved method of explosively expanding a metal tube into a surrounding metal component by means of an explosive charge axially disposed within the tube, the method being suitable for expanding large diameter tubes. In the improved method the thick-walled moulded insert used with axially disposed charges is replaced by a liquid filled shell which is formed to accommodate the axial charge and to fit closely in the bore of the metal tube. The hollow thin-walled insert is cheaper to make and the use of liquid as the principal means of transmitting the radial shock wave significantly reduces the attenuation of the shock wave by comparison with solid materials thus reducing the amount of explosive charge required for a given operation.

Thus in accordance with the invention a method of explosively expanding a tubular metal component into engagement with a surrounding metal component wherein an explosive charge is disposed axially and fired within a shock wave transmitting insert located within the porton of the tubular metal component to be expanded, is characterised in that the shock wave transmitting insert comprises a hollow cylindrical container fitting closely within the portion of the tubular metal component to be expanded and having charge-holding means to accommodate the explosive charge and locate it axially within the container, the container being filled with a shock wave-transmitting liquid, for example water.

The invention also includes a shock wave-transmitting insert for holding an explosive charge axially within a tubular metal element to be expanded and to transmit the shock wave from the charge to the tubular metal element when the charge is fired, the insert comprising a hollow cylindrical container and charge-holding means to accommodate an explosive charge and locate it axially within the container, and the container being adapted in use to be filled with a shock wave-transmitting liquid.

The charge-holding means conveniently comprises a pocket extending axially into the container from an end-wall of the container.

The hollow cylindrical container is preferably fabricated from synthetic plastics material for example, polyethylene. It may be blow-moulded but a preferred form of container comprises an outer open-ended cylindrical shell and a lid for closing the open end of the shell, the lid having a pocket formed therein and adapted to hold the explosive charge. The shell and/or the lid may, for example, be spin-moulded thermoplastics material such as polyethylene.

The outer shell of the preferred container is advantageously formed with an external flange at its open end, the flange being operative to abut an end of the tubular metal element which is to be expanded thereby effecting positive axial location of the insert in the tubular element.

The joint between the lid and the shell is preferably sealed to prevent leakage of liquid from the interior of the insert, suitable sealing means including at least two circumferential inward projections on the wall of the outer shell, which projections engage the periphery of the lid.

The invention is further illustrated by the preferred embodiment which is hereinafter described with reference to the accompanying drawing which shows in longitudinal medial cross-section an insert of the invention in position for expanding a metal tube into engagement with a tube plate.

As shown in the drawing the insert 10 comprises an open-ended cylindrical container 11 and a lid 12, the container and lid both being fabricated from moulded polyethylene. The lid has an axial tubular pocket 13 formed therein and is held in watertight engagement with the container 11 by internal circumferential projections 14 and 15 which grip the peripheral edge of the lid. An aperture 16 is formed in the lid 12 through which the interior of the insert 10 may be filled with water 17 or excess water can be drained when the lid is lowered into position under water in container 11. A closure plug 18 is provided to close the aperture 16 to prevent water loss from the insert. The container 11 is formed with an external flange 19 at its open end. The pocket 13 is filled with a plastic explosive charge 20. For firing the explosive charge 20 an electric detonator 21 is inserted into the outer end of the charge.

In the tube expansion operation an end portion of a metal tube 22 is placed in an aperture of an outer metal component 23 and the water-filled insert 10 is inserted into the tube 22 until the flange 19 abuts the tube end.

When the charge 20 explodes the tube 22 is expanded into engagement with the outer component 23.

I claim:

1. A shock wave-transmitting insert for holding an explosive charge axially within a tubular metal element to be expanded and to transmit the shock wave from the said charge to the said tubular metal element when the charge is fired, characterised in that the said insert comprises a hollow cylindrical container and charge-holding means to accommodate an explosive charge and locate it axially within the container, said container being adapted in use to be filled with a shock wave-transmitting liquid.

2. An insert as claimed in claim 1 wherein the said charge-holding means comprises a pocket extending axially into the container from an end wall of the container.

3. An insert as claimed in claim 1 wherein the said hollow cylindrical container is fabricated from synthetic plastics material.

4. An insert as claimed in claim 3 wherein the hollow cylindrical container is fabricated from polyethylene.

5. An insert as claimed in claim 1 wherein the hollow cylindrical container is a blow moulded container.

6. An insert as claimed in claim 1 wherein the hollow cylindrical container comprises an outer open-ended cylindrical shell and a lid for closing the open end of said shell, said lid having a pocket formed therein and adapted to hold the explosive charge.

7. An insert as claimed in claim 6 wherein the shell and/or the lid is spin-moulded thermoplastics material.

8. An insert as claimed in claim 6 wherein the outer shell is formed with an external flange at its open end, said flange being operative to abut an end of a tubular metal element which is to be expanded thereby effecting positive axial location of the insert in said tubular element.

9. An insert as claimed in claim 6 comprising sealing means to seal the joint between said lid and said shell to prevent leakage of liquid from the interior of the insert.

10. An insert as claimed in claim 9 wherein the sealing means comprises at least two circumferential inward projections on the wall of the outer shell which engage the periphery of the lid.

11. A method of explosively expanding a tubular metal component into engagement with a surrounding metal component comprising the steps of axially disposing an explosive charge within a hollow cylindrical container fitting closely within the portion of said tubular metal component to be expanded, said container having a charge-holding means constituting an integral part of said container, filling said container with a shock wave-transmitting liquid, and firing said explosive charge.

* * * * *